(12) United States Patent
Nomura et al.

(10) Patent No.: US 6,369,962 B1
(45) Date of Patent: Apr. 9, 2002

(54) ZOOM LENS BARREL

(75) Inventors: Hiroshi Nomura, Saitama; Nobuaki Aoki, Tokyo; Takamitsu Sasaki, Saitama; Kazunori Ishizuka, Kanagawa, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/695,032

(22) Filed: Oct. 25, 2000

(30) Foreign Application Priority Data

Oct. 27, 1999 (JP) .......................................... 11-305224

(51) Int. Cl.7 ............................ G02B 7/02; G02B 15/14
(52) U.S. Cl. ........................ 359/822; 359/700; 359/701
(58) Field of Search .............................. 359/822, 823, 359/826, 696, 699, 700, 701, 703, 704; 396/75, 85, 348, 349

(56) References Cited

U.S. PATENT DOCUMENTS 5,765,048 A * 6/1998 Nomura et al. ............... 396/72
5,956,189 A * 9/1999 Azegami et al. ............ 359/823
6,014,269 A   1/2000 Nomura et al. ............. 359/701
6,118,601 A   9/2000 Iikawa et al. ............... 359/823

* cited by examiner

Primary Examiner—Georgia Epps
Assistant Examiner—Saeed Seyrafi
(74) Attorney, Agent, or Firm—Greenblum & Bernstein, P.L.C.

(57) ABSTRACT

A zoom lens barrel includes a first cylindrical member having first and second bottomed grooves, which intersect each other, on an inner peripheral surface thereof; a first moving member which is provided with a first radial projection which is fitted in the first bottomed groove, the first moving member being movable relative to the first cylindrical member; and a second moving member which is provided with a second radial projection which is fitted in the second bottomed groove, the second moving member being movable relative to the first cylindrical member. The shapes of the first bottomed groove and the first radial projection and the shapes of the second bottomed groove and the second radial projection are such that the second radial projection cannot be fitted in the first bottomed groove and that the first radial projection cannot be fitted in the second bottomed groove.

20 Claims, 11 Drawing Sheets

FIG. 9
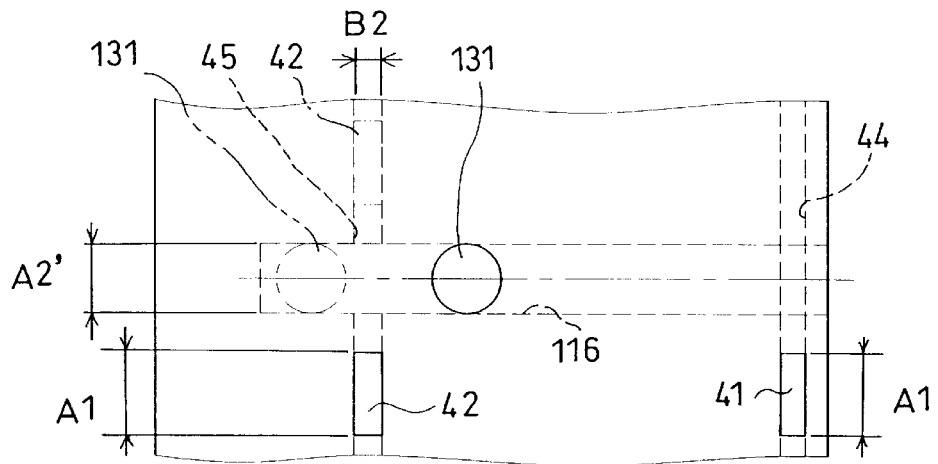
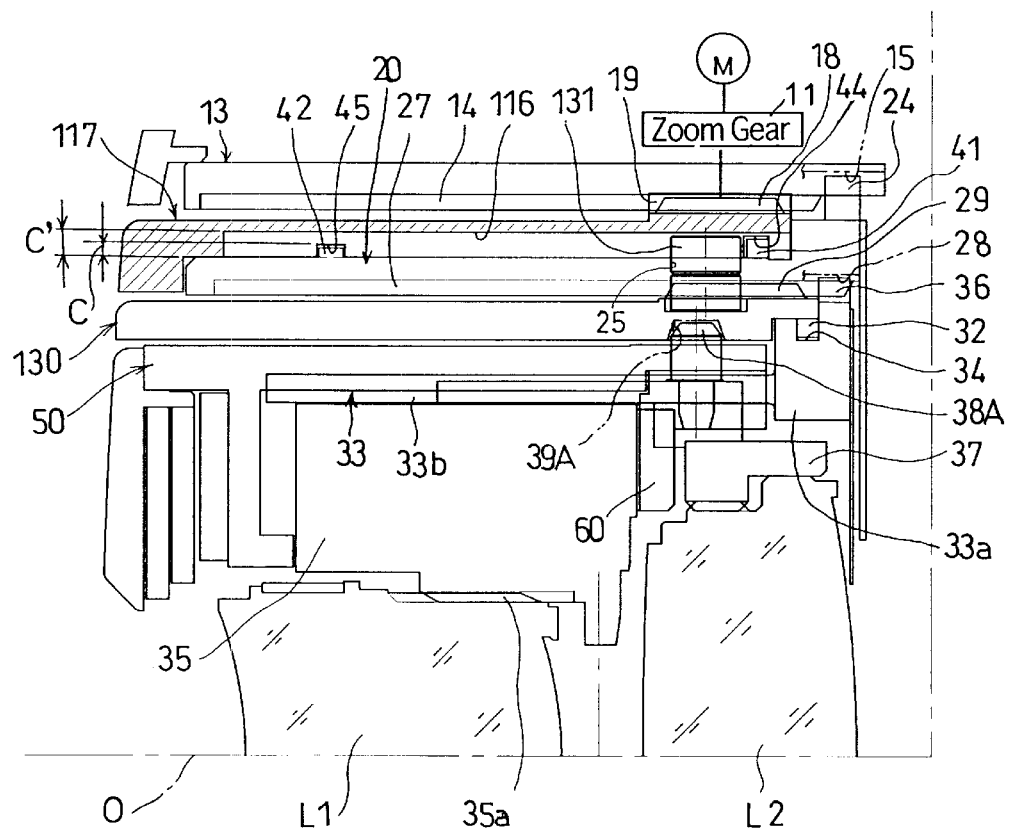
FIG. 6

US 6,369,962 B1

ZOOM LENS BARREL

BACKGROUND OF THE INVENTION

1. Field of the Invention

The present invention relates to a zoom lens barrel.

2. Description of the Related Art

In a known zoom lens barrel of a zoom compact camera, etc., a cylindrical member which constitutes a lens barrel is provided on its inner peripheral surface with a plurality of guide grooves extending in different directions, to guide internal moving members or lens groups, etc. In order to achieve further miniaturization of the zoom lens barrel, a construction wherein the guide grooves intersect has been proposed. However, in such a construction, it is necessary to prevent radial guide projections which are guided in corresponding guide grooves from being disengaged therefrom or from entering other guide grooves at the intersections of the guide grooves. For instance, the lens barrel is provided on its inner peripheral surface with an axial groove extending in parallel with the optical axis and a circumferential groove intersecting the axial groove, so that when the lens barrel member having the axial groove is rotated to apply a force to a radial projection which is fitted in the axial groove, the inner moving member having the radial projection is moved in the optical axis direction. In this arrangement, the radial projection is moved in the axial directions while being subject to a rotational force in the circumferential direction. Therefore, there is a possibility that the radial projection is disengaged from the axial groove and enters the circumferential groove at the intersection of the axial groove and the circumferential groove, due to the circumferential force. Also, there is a possibility that the radial projection fitted in the circumferential groove is disengaged therefrom at the intersection with the axial groove.

SUMMARY OF THE INVENTION

It is an object of the present invention to provide a zoom lens barrel in which it is possible to prevent a radial projection, which is guided in a plurality of guide grooves which intersect each other, from being disengaged from the associated guide grooves at the intersection thereof.

To achieve the object mentioned above, according to an aspect of the present invention, a zoom lens barrel is provided, including a first cylindrical member having first and second bottomed grooves on an inner peripheral surface thereof, the first and second grooves having different profiles, wherein the first and second bottomed grooves intersect each other; a first moving member which is provided with a first radial projection which is fitted in the first bottomed groove, the first moving member being movable relative to the first cylindrical member in accordance with the profile of the first bottomed groove; and a second moving member which is provided with a second radial projection which is fitted in the second bottomed groove, the second moving member being movable relative to the first cylindrical member in accordance the profile of the second bottomed groove. The shapes of the first bottomed groove and the first radial projection and the shapes of the second bottomed groove and the second radial projection are such that the second radial projection cannot be fitted in the first bottomed groove and that the first radial projection cannot be fitted in the second bottomed groove.

Preferably, the first cylindrical member having the first and second bottomed grooves is driven and rotated by a rotational drive device, the first moving member defines a second cylindrical member which is guided to move in an optical axis direction within the first cylindrical member, and the second moving member defines a third cylindrical member which is guided to rotate and move in the optical axis direction within the second cylindrical member.

The first bottomed groove is a circumferential groove about an optical axis; and the second bottomed groove is an axial groove extending in parallel with the optical axis.

In an embodiment, a length of the first radial projection along the first groove is greater than a width of the second groove, and a length of the second radial projection along the second groove is greater than a width of the first groove.

In another embodiment, the first and second grooves are bottomed grooves; one of the first and second radial projections is longer, in a radial direction thereof, than a depth of the groove in which the other of the first and second radial projections is fitted; and a length of the one of the first and second radial projections, along the groove in which the one of the first and second radial projection is fitted, is greater than a width of the groove in which the other of the first and second radial projection is fitted.

According to another aspect of the present invention a zoom lens barrel is provided, including a first cylindrical member having, on an inner peripheral surface thereof, an axial groove extending in parallel with an optical axis and a circumferential groove extending in the circumferential direction about the optical axis, the circumferential groove intersecting the axial groove; a first moving member which is provided with a circumferential guide projection which is fitted in the circumferential groove, the first moving member being movable relative to the first cylindrical member in accordance with the profile of the circumferential groove; and a second moving member which is provided with an axial guide projection which is fitted in the axial groove, the second moving member being movable relative to the first cylindrical member in accordance with the profile of the axial groove. The engagement length of the circumferential guide projection and the circumferential groove, in at least one of the circumferential direction and the radial direction perpendicular to the optical axis, is greater than the circumferential width or radial depth of the axial groove. The engagement length of the axial guide projection and the axial groove, in at least one of the axial direction and the radial direction perpendicular to the optical axis, is greater than the axial width or radial depth of the circumferential groove.

According to another aspect of the present invention a barrel assembly used in a zoom lens barrel is provided, including a first cylindrical member having, on an inner peripheral surface thereof, an axial groove extending in parallel with an optical axis and a circumferential groove extending in the circumferential direction about the optical axis, the circumferential groove intersecting the axial groove; a first moving barrel which is provided with a circumferential guide projection which is fitted in the circumferential groove, the first moving barrel being movable relative to the first cylindrical member in accordance with the profile of the circumferential groove; and a second moving barrel which is provided with an axial guide projection which is fitted in the axial groove, the second moving barrel being movable relative to the first cylindrical member in accordance with the profile of the axial groove. The engagement length of the circumferential guide projection and the circumferential groove, in at least one of the circumferential direction and the radial direction perpendicular to the optical axis, is greater than the circumferential width or radial depth of the axial groove. The engagement length of the axial guide projection and the axial groove, in at least one of the axial direction and the radial direction perpendicular to the optical axis, is greater than the axial width or radial depth of the circumferential groove.

With the two above-described arrangements, since the circumferential guide projection and the axial guide projection are engaged in the corresponding circumferential groove and the axial groove in at least one of the slide movement direction and the radial direction, no disengagement of the guide projections from the associated grooves takes place even at the intersections of the grooves.

The structure to prevent the circumferential and radial guide projections from being disengaged from the associated grooves can be embodied as follows. Namely, the axial guide projection can be provided with a pair of parallel planar surfaces which are brought into sliding contact with a pair of opposed wall surfaces of the axial groove which extend in the optical axis direction, the planar surfaces having axial lengths greater than the axial width of the circumferential groove; wherein the circumferential length of the circumferential guide projection is greater than the circumferential width of the axial groove.

Consequently, in this arrangement in which the radial and circumferential projections are elongated in the direction of the slide movement thereof, since the amount of engagement thereof with the corresponding grooves in the radial direction can be reduced, the lens barrel can be made small. From the viewpoint of the miniaturization of the lens barrel, it is preferable that the radial depth of the axial groove be substantially identical to the radial depth of the circumferential groove.

Likewise, in an embodiment, the axial guide projection is provided with a pair of parallel planar surfaces which are brought into sliding contact with a pair of opposed wall surfaces of the axial groove which extend in the optical axis direction, the planar surfaces having axial lengths greater than the axial width of the circumferential groove; wherein the radial depth of the circumferential groove is greater than the radial depth of the axial groove, the circumferential guide projection being fitted in the circumferential groove so that the length of projection of the circumferential guide projection in the radial direction is greater than the depth of the axial groove.

In this arrangement, the radial depth of the circumferential groove is greater than the radial depth of the axial groove, and the circumferential guide projection is fitted in the circumferential groove, so that the length of projection of the circumferential guide projection in the radial direction is greater than the depth of the axial groove. Consequently, the circumferential length of the circumferential guide projection is smaller than the circumferential width of the axial groove.

In an embodiment, the radial depth of the axial groove is greater than the radial depth of the circumferential groove, the axial guide projection being fitted in the axial groove so that the length of projection thereof in the radial direction is greater than the depth of the circumferential groove; wherein the circumferential length of the circumferential guide projection is greater than the circumferential width of the axial groove.

In this structure, the axial guide projection is in the form of a cylinder which is brought into contact at opposite longitudinal sides of the cylinder with a pair of opposed wall surfaces, which extend in the optical axis direction, of the axial groove.

In an embodiment, the first cylindrical member is driven and rotated by a rotational drive device; wherein the first moving member defines a second cylindrical member which is guided to move in an optical axis direction within the first cylindrical member; the second moving member defines a third cylindrical member which is guided to move in the optical axis direction within the second cylindrical member, while being rotated relative to the second cylindrical member in accordance with the rotation of the first cylindrical member in accordance with the profile of the axial groove; and the second cylindrical member is provided with a through groove through which the axial guide projection of the third cylindrical member extends.

In this structure, the axial guide projection can be made of a cylinder which is brought into contact with a pair of opposed wall surfaces of the axial groove in the optical axis direction at radial lines.

The present disclosure relates to subject matter contained in Japanese Patent Application No. 11-305224 (filed on Oct. 27, 1999) which is expressly incorporated herein by reference in its entirety.

BRIEF DESCRIPTION OF THE DRAWINGS

The invention will be discussed below in detail with reference to the drawings, in which:

FIG. 6 is a longitudinal sectional view of a zoom lens barrel in a retracted position, according to a second embodiment of the present invention;

FIG. 9 is a developed plan view of a relationship between linear cam grooves and cam projections, and between annular grooves and engagement pawls, in a zoom lens barrel shown in FIGS. 6 and 7;

DESCRIPTION OF THE PREFERRED EMBODIMENT

Figure 5:
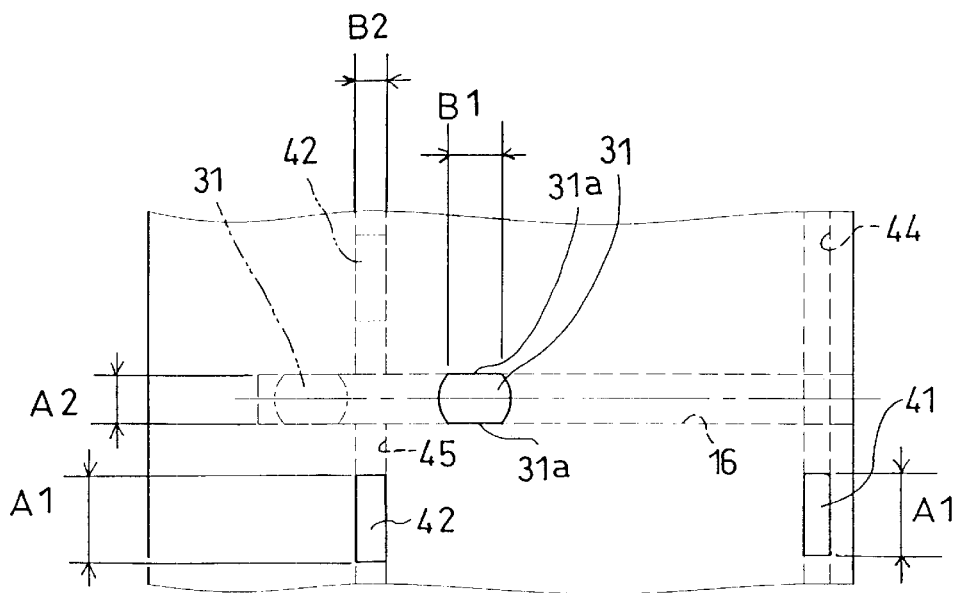
FIG. 5 is a developed plan view of a relationship between linear cam grooves and cam projections, and between annular grooves and engagement pawls, in a zoom lens barrel shown in FIGS. 1 and 2.

A first embodiment of the present invention will be discussed below with reference to FIGS. 1 though 5. In this embodiment, a zoom lens barrel 10 is provided on a camera body of a zoom compact camera (not shown). The zooming operation is carried out by varying a distance between a first lens group L1 and a second lens group L2 and a distance of the lens groups from a film surface. The focusing operation is carried out by moving the first lens group L1 in the direction of the optical axis O. Looking at FIGS. 1 and 2, the structure and operation of the zoom lens barrel 10 will be generally discussed below. Note that in the following discussion, the optical axis direction refers to a direction parallel to the photographing optical axis, and the circumferential direction refers to a circumferential direction about the photographing optical axis.

A stationary barrel 13 is secured to a camera body (not shown). The stationary barrel 13 is provided on its inner surface with a female helicoid 14 and linear movement guide grooves 15 extending in parallel with the optical axis O. A plurality of linear movement guide grooves 15 are provided at circumferentially different positions on the stationary barrel 13; only one of them is shown in FIGS. 1 and 2. Note that the stationary barrel 13 is provided with a cut-away portion (not shown) elongated in a direction parallel with the optical axis O, so that a tooth surface of a zoom gear 11 is exposed inwardly through the cut-away portion. The zoom gear 11 is rotated about an axis parallel with the optical axis O by a zoom motor (rotational drive device) M.

The female helicoid 14 of the stationary barrel 13 is in mesh with a male helicoid 18 formed on the outer surface of a first rotary cylinder (cylindrical member) 17 at the rear end thereof. The thread of the male helicoid 18 of the first rotary cylinder 17 is partly widened so that an outer peripheral gear 19, which is engaged with the zoom gear 11, is provided on the wide thread. The teeth of the outer peripheral gear 19 are parallel with the optical axis O. The first rotary cylinder 17 is provided on its inner surface with a pair of linear cam grooves (axial grooves) 16 which are arranged substantially symmetrically with respect to the optical axis O. The linear cam grooves 16 extend in parallel with the optical axis and have bottoms. The linear cam grooves 16 open at the rear ends thereof into the rear end face of the first rotary cylinder 17, as shown in FIGS. 1 and 2.

Figure 4:
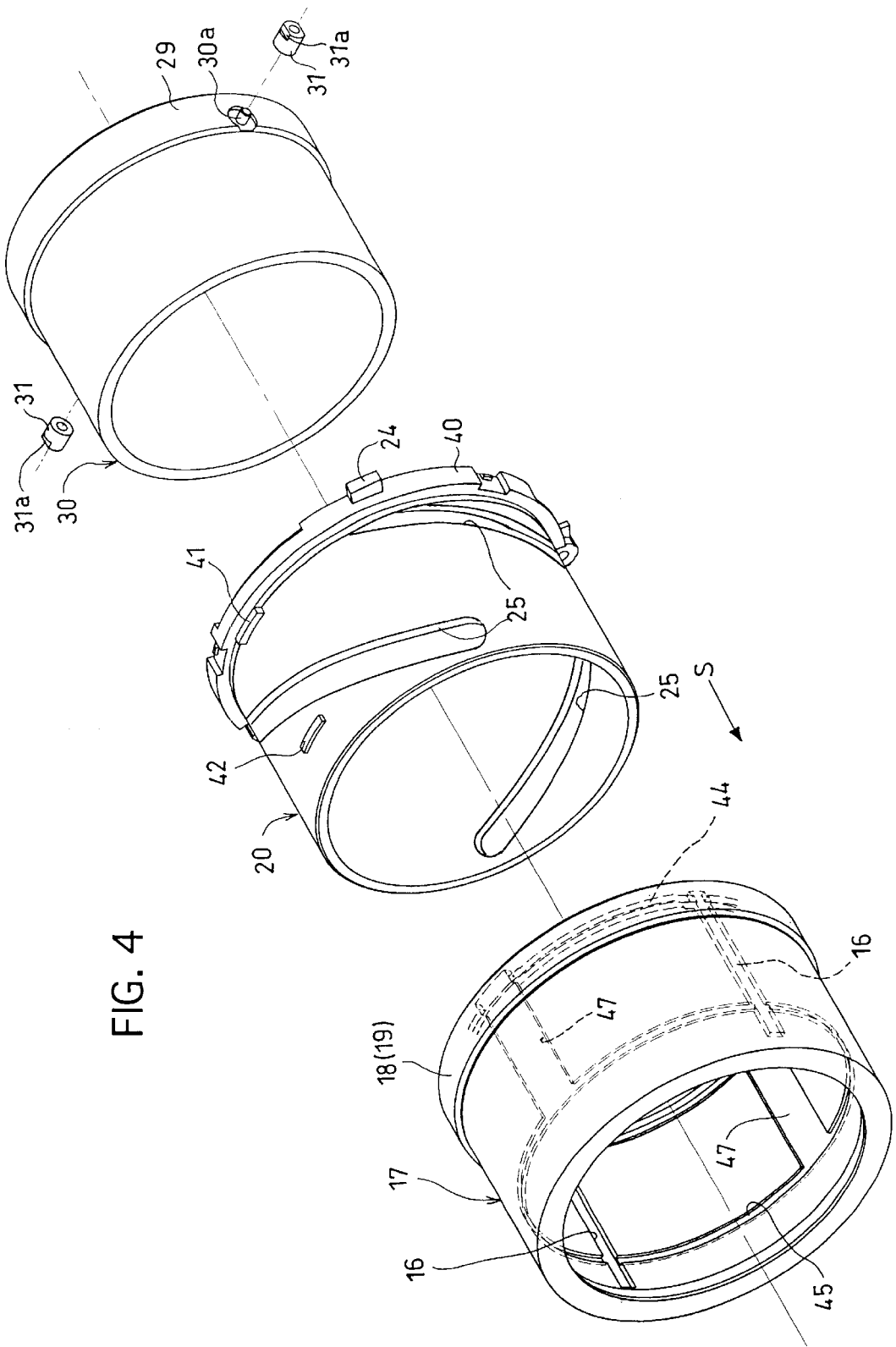
FIG. 4 is an exploded perspective view of a first rotary cylinder, a first linear movement cylinder, and a second rotary cylinder, of a zoom lens barrel shown in FIGS. 1 and 2.

A first linear movement cylinder (first moving member (barrel) or second cylindrical member (barrel)) 20 is provided in the first rotary cylinder 17. The first linear movement cylinder 20 is connected to the first rotary cylinder 17 so as to relatively rotate about the optical axis O and so as not to relatively move in the optical axis direction. The first linear movement cylinder 20 is provided, on its rear end of the outer peripheral surface, with radially and outwardly extending linear movement guide projections 24 (only one of which is shown in FIGS. 1, 2 and 4) that are spaced from one another in the circumferential direction at a predetermined distance. The linear movement guide projections 24 are slidably engaged in the linear movement guide groove 15 formed on the inner surface of the stationary barrel 13. Consequently, the first linear movement cylinder 20 is movable together with the first rotary cylinder 17 in the optical axis direction and is not rotatable relative to the stationary barrel 13 in the circumferential direction about the optical axis O. Namely, the first linear movement cylinder 20 is guided so as to linearly move along the optical axis O.

The first rotary cylinder 17 and the first linear movement cylinder 20 constitute a first feed stage of the zoom lens barrel 10. In the first feed stage, when the zoom gear 11 is rotated by the zoom motor M in a predetermined barrel feed direction, the first rotary cylinder 17 is rotated through the outer peripheral gears 19, so that the first rotary cylinder 17 is moved (extended) forward from the stationary barrel 13 while being rotated, through the engagement of the female helicoid 14 and the male helicoid 18. At the same time, the first linear movement cylinder 20 which is supported to rotate relative to the first rotary cylinder 17 is moved in the optical axis directions together with the first rotary cylinder 17 while being guided to linearly move relative to the stationary barrel 13. Note that the zoom gear 11 is made of multiple pinions elongated in the optical axis direction, so that the outer peripheral gears 19 are not disengaged from the zoom gear 11 when the first rotary cylinder 17 is advanced forward (outward).

The first linear movement cylinder 20 is provided on its inner surface with a female helicoid 27 whose direction is the same as that of the female helicoid 14. The first linear movement cylinder 20 is also provided on its inner surface with linear movement guide grooves 28 which extend in parallel with respect to the optical axis O and which are spaced from one another at a predetermined distance in the circumferential direction. The linear movement guide grooves 28 are located at circumferentially different positions on the first linear movement cylinder 20. Only one of the linear movement guide grooves 28 is shown in FIGS. 1 and 2.

Also, the first linear movement cylinder 20 is provided with two through grooves 25 that extend through the thickness of the cylinder from the outer peripheral surface to the inner peripheral surface. The two through groove 25 are parallel to be substantially parallel with the threads of the female helicoid 27 and are inclined with respect to the optical axis O.

A second rotary cylinder (second moving member (barrel) or third cylindrical member (barrel)) 30 which is provided on its outer peripheral surface with a male helicoid 29 which is in mesh with the female helicoid 27 is provided within the first linear movement cylinder 20. The male helicoid 29 is provided on the outer peripheral surface of the rear end of the second rotary cylinder 30. The second rotary cylinder 30 is provided on the outer peripheral surface of the rear end thereof with a pair of support pins 30a (only one of which is shown in FIG. 4) that extend through cut-away portions of the male helicoid 29. A pair of cam projections (radial projection/axial guide projections) 31 (omitted in FIG. 3) are mounted to the support pins 30a. The cam projections 31 which will be described in detail hereinafter extend through the through grooves 25 formed in the first linear movement cylinder 20 and are engaged, at the front ends, in axially extending linear cam grooves 16 formed on the inner surface of the first rotary cylinder 17. Consequently, when the first rotary cylinder 17 is rotated by the zoom motor M, the rotational force is transmitted to the second rotary cylinder 30 through the cam projections 31 that engage with the linear cam grooves 16. As a result, the second rotary cylinder 30 is moved forward (fed) from the first linear movement cylinder 20 while being rotated in the same direction as the first rotary cylinder 17, through the engagement between the male helicoid 29 and the female helicoid 27. Since the cam projections 31 extend through the through grooves 25 parallel with the female helicoid 27, the cam projections 31 are moved in the through grooves 25 in accordance with the feed operation. Conversely, when the first rotary cylinder 17 is rotated in the retracted position, the second rotary cylinder 30 is moved into the first linear movement cylinder 20 while rotating in the same direction as the first rotary cylinder 17.

A second linear movement cylinder 33 is provided within the second rotary cylinder 30. The second linear movement cylinder 33 includes a flange portion 33a on the rear end side, and three linear movement guide portions 33b in front of the flange portion 33a in the optical axis direction. An annular groove 34 whose center is located on the optical axis O is formed on the outer peripheral surface of the flange portion 33a. The second rotary cylinder 30 is provided on its inner surface with engagement pawls 32 that are fitted in the annular groove 34, so as not to relatively move in the optical axis direction O but so as to relatively rotate. The engagement pawls can be disengaged only at a specific angular position.

The second linear movement cylinder 33 is provided on the outer surface of the rear end thereof with a plurality of radially extending linear movement guide projections 36 at different circumferential positions. The linear movement guide projections 36 are slidably engaged in the linear movement guide grooves 28 formed on the inner peripheral surface of the first linear movement cylinder 20. Consequently, the second linear movement cylinder 33 is linearly guided by the first linear movement cylinder 20.

The second rotary cylinder 30 and the second linear movement cylinder 33 constitute a second feed stage of the zoom lens barrel 10. As mentioned above, when the first rotary cylinder 17 which constitutes the first feed stage is rotated to move the same forward from the first rotary cylinder 17, the second rotary cylinder 30 is advanced from the first linear movement cylinder 20 while rotating in the same direction as the first rotary cylinder 17 with respect to the stationary barrel 13. At the same time, the second linear movement cylinder 33, which is connected to the second rotary cylinder 30 so as only to relatively rotate, is linearly guided by the first linear movement cylinder 20 and is moved along the optical axis O together with the second rotary cylinder 30 in accordance with the relationship between the linear movement guide projections 36 and the linear movement guide grooves 28.

A third linear movement cylinder 50 is provided between the second rotary cylinder 30 and the second linear movement cylinder 33. The third linear movement cylinder 50 is provided with an entirely circular cylindrical surface which defines an outer appearance of the lens barrel 10, unlike the second linear movement cylinder 33 which is a partially circular cylinder. The third linear movement cylinder 50 is provided therein with a shutter block 35 secured thereto through a linear movement guide ring 60. The first lens group L1 is supported by the shutter block 35 through a focusing helicoid 35a, so that when a focusing motor (not shown) incorporated in the shutter block 35 is driven, the first lens group 11 is moved in the direction of the optical axis O while rotating, in accordance with the focusing helicoid 35a, to carry out the focusing operation.

The linear movement guide ring 60 is secured to the rear end of the shutter block 35. The linear movement guide ring 60 is provided with three first linear movement guide groves 61 and three second linear movement guide grooves 62, which are arranged alternately in the circumferential direction. The first and second linear movement guide grooves 61 and 62 extend in the optical axis direction. Three linear movement guide portions 33b provided on the second linear movement cylinder 33 are fitted in the first linear movement guide grooves 61. Due to the engagement of the linear movement guide portions 33b in the corresponding first linear movement guide grooves 61, the third linear movement cylinder 50 (shutter block 35) and the linear movement guide ring 60 are guided to linearly move in the optical axis direction. The third linear movement cylinder 50 is provided on its inner surface with three axially extending interference prevention grooves 51 (only one of which is shown in FIGS. 2 and 3) at circumferential positions corresponding to the first linear movement guide grooves 61. The interference prevention grooves 51 are adapted to prevent the linear movement guide portions 33b guided by the linear movement guide ring 60 from interfering with the third linear movement cylinder 50.

Three first rollers 38A are provided on the outer surface of the rear end of the third linear movement cylinder 50 at different circumferential positions. The third linear movement cylinder 50 and the linear movement guide ring 60 are partly overlapped at the rear ends thereof. The inner ends of the first rollers 38A in the radial direction extend in the third linear movement cylinder 50 and are inserted in the linear movement guide ring 60 at the overlapped portion to connect the third linear movement cylinder 50 and the linear movement guide ring 60 so as not to move relative to each other in the optical axis direction or in the circumferential direction. The outer ends of the first rollers 38A in the radial direction are slidably fitted in first lens group guide grooves 39A formed on the inner peripheral surface of the second rotary cylinder 30. The first lens group guide grooves 39A are inclined at a predetermined angle with respect to the optical axis O, so that when the second rotary cylinder 30 is rotated, the first rollers 38A are guided by the first lens group guide grooves 39A. Consequently, the third linear movement cylinder 50 which is guided to move linearly through the second linear movement cylinder 33 is moved forward or backward in the optical axis direction with respect to the second feed stage. Namely, the third linear movement cylinder 50 constitutes a third feed stage of the zoom lens barrel 10. The first lens group L1 is moved together with the third linear movement cylinder 50 in the optical axis direction.

Three linear movement guide portions 37a provided on a second lens group support frame 37 which supports the second lens group L2 are slidably fitted in the second linear movement guide grooves 62 of the linear movement guide ring 60. Due to the engagement of the linear movement guide portions 37a in the second linear movement guide grooves 62, the second lens group support frame 37 is guided to linearly move in the optical axis direction. A second roller 38B protrudes in the radially outward direction from each linear movement guide portion 37a of the second lens group support frame 37. The second rollers 38B are slidably fitted in second lens group guide grooves 39B formed on the inner peripheral surface of the second rotary cylinder 30 as shown in FIG. 2. The second lens group guide grooves 39B are inclined at a predetermined angle with respect to the optical axis O, so that when the second rotary cylinder 30 is rotated, the second rollers 38B are guided by the second lens group guide grooves 39B. Consequently, the rear lens group support frame 37 which is guided to move linearly and the second lens group L2 are moved forward or backward in the optical axis direction within the second linear movement cylinder 33. Note that in FIG. 1, the first rollers 38A and the second rollers 38B are circumferentially overlapped, and hence, only the first rollers 38A are shown.

The zoom lens barrel 10 constructed as above operates as follows. When the zoom motor M is driven in the forward-feed direction, the first rotary cylinder 17 is advanced from the stationary barrel 13 while rotating. As a result, the first linear movement cylinder 20 is moved forward together with the first rotary cylinder 17, while being guided by the stationary barrel 13 to move linearly. Consequently, the second rotary cylinder 30 is moved forward from the first linear movement cylinder 20 while rotating in the same direction as the first rotary cylinder 17. At the same time, the second linear movement guide cylinder 33 is moved linearly in the optical axis direction O together with the second rotary cylinder 30. When the second rotary cylinder 30 is rotated and advanced, the third linear movement cylinder 50 is further moved forward in the optical axis direction together with the first lens group L1, in accordance with the first lens group guide grooves 39A formed on the inner peripheral surface of the second rotary cylinder 30. At the same time, the second lens group L2 which is guided by the second lens group guide grooves 39B is moved in accordance with a predetermined track within the second rotary cylinder 30. Consequently, the first lens group L1 and the second lens group L2 are moved forward in the optical axis direction, while varying the distance therebetween.

When the zoom motor M is rotated in the reverse direction (toward the retracted position), the zoom lens barrel 10 carries out the above-mentioned operations but in the opposite order.

As can be understood from the foregoing, in the zoom lens barrel 10 having three feed-stages, the zooming operation is carried out by the composite operations of the variation of the distance of the first and second lens groups L1 and L2 from the film surface and the relative movement of the first and second lens groups L1 and L2 close to or away from one another. Moreover, the focusing operation is carried out by moving the first lens group L1 in a direction parallel with the optical axis O at each focal length which is varied in accordance with the zooming operation.

The significant constituent features of the present invention will be discussed below. As mentioned above, the first rotary cylinder 17 and the first linear movement cylinder 20 are connected so as to relatively rotate about the optical axis O but not to relatively move in the optical axis direction. The connection structure is as follows.

The first linear movement cylinder 20 is provided on its rear end with a rear end rib 40 whose diameter is larger than that of the body portion of the first linear movement cylinder 20. Also, the first linear movement cylinder 20 is provided on its outer peripheral surface with two rear engagement pawls (radial projections/circumferential guide projections) 41 that are located in front of and close to the rear end rib 40, and two front engagement pawls (radial projections/circumferential guide projections) 42 that circumferentially correspond to the rear engagement pawls 41. The engagement pawls 41 and 42 are identical by an length A1 (see FIG. 5) in the circumferential direction. Note that only one engagement pawl 41 and one engagement pawl 42 are shown in the drawings. Furthermore, the front engagement pawls 42, in cooperation with rear engagement pawls 41, are provided so as to increase strength and mechanical precision of the zoom lens barrel 10.

The first rotary cylinder 17 is provided on its inner peripheral surface with a rear annular groove (circumferential groove) 44 at the rear end thereof and a front annular groove (circumferential groove) 45 in front of the rear annular groove 44. The rear annular groove 44 and the front annular groove 45 have bottoms and are formed in parallel with respect to each other in a direction perpendicular to the optical axis O. The front and rear annular grooves 45 and 44 are located on opposite sides of the first rotary cylinder 17 in the optical axis direction. The axial distance between the front and rear annular grooves 45 and 44 corresponds to the axial distance between the front and rear engagement pawls 42 and 41 of the first linear movement cylinder 20.

The width of the rear engagement pawls 41 in the optical axis direction is such that the rear engagement pawls 41 cannot be moved in the optical axis direction, but can be slid in the circumferential direction relative to the rear annular groove 44. Likewise, the width of the front engagement pawls 42 in the optical axis direction is such that the front engagement pawls 42 cannot be moved in the optical axis direction, but can be slid in the circumferential direction relative to the front annular groove 45.

The first rotary cylinder 17 is provided on its inner peripheral surface with two pawl engagement/disengagement grooves 47 which have bottoms and extend from the rear end thereof to the front annular groove 45 through the rear annular groove 44 in the optical axis direction. The rear ends of the pawl engagement/disengagement grooves 47 open into the rear end face of the first rotary cylinder 17.

The positions of the pawl engagement/disengagement grooves 47 in the circumferential direction correspond to the rear engagement pawls 41 and the front engagement pawls 42. The width of the pawl engagement/disengagement grooves 47 in the circumferential direction is slightly greater than the length A1 of the engagement pawls 41 and 42, in the circumferential direction, so that the engagement pawls can be moved in the optical axis direction within the pawl engagement/disengagement grooves 47.

Upon assembling the first rotary cylinder 17 and the first linear movement cylinder 20, the angular positions thereof are registered and the first linear movement cylinder 20 is inserted in the direction S in FIG. 4, into the rear end of the first rotary cylinder 17, so that the two front engagement pawls 42 correspond to the two pawl engagement/disengagement grooves 47, respectively. Consequently, the front engagement pawls 42 are moved in the pawl engagement/disengagement grooves 47. Further insertion causes the rear engagement pawls 41 to enter the respective pawl engagement/disengagement grooves 47. Since the rear end rib 40 is provided at the rear end of the first linear movement cylinder 20 behind the rear engagement pawls 41, the rear end rib 40 abuts against the rear end face of the first rotary cylinder 17 immediately after the rear engagement pawls 41 enter the pawl engagement/disengagement grooves 47. Thus, no further insertion is permitted.

In this position, the pair of rear engagement pawls 41 correspond to the rear annular groove 44 and the pair of front engagement pawls 42 correspond to the front annular groove 45, so that the first rotary cylinder 17 and the first linear movement cylinder 20 are relatively rotatable due to the engagement of the front and rear engagement pawls in the corresponding front and rear annular grooves. When a slight relative rotation of the first rotary cylinder 17 and the first linear movement cylinder 20 takes place at a disengageable angular position, the front and rear engagement pawls 42 and 41 are disengaged from the pawl engagement/ disengagement grooves 47 and are moved into the corresponding front and rear annular grooves 45 and 44. Consequently, in this state, it is impossible to draw the first linear movement cylinder out of the first rotary cylinder 17. Namely, the first rotary cylinder 17 and the first linear movement cylinder 20 are connected to each other so as to relatively rotate about the optical axis O but not to relatively move in the direction of the optical axis O. To disengage the first rotary cylinder 17 and the first linear movement cylinder 20, the above mentioned operations are performed in the opposite order; i.e., the first rotary cylinder 17 and the first linear movement cylinder 20 are rotated to the disengageable angular position in which the engagement pawls 41 and 42 are in the respective pawl engagement/disengagement grooves 47. Thereafter, the first linear movement cylinder 20 is drawn backward.

In the assembling operation mentioned above, it is possible to incorporate the second rotary cylinder 30 in the first linear movement cylinder 20 before the first rotary cylinder 17 and the first linear movement cylinder 20 are assembled. The second rotary cylinder 30 is provided with a pair of cam projections 31, so that when the second rotary cylinder 30 is inserted in the first linear movement cylinder 20, the pair of cam projections 31 extend through the corresponding through grooves 25, with the front ends protruding outward in radial directions. Thereafter, as mentioned above, the angular positions of the first rotary cylinder 17 and the first linear movement cylinder 20 are registered, so that each front engagement pawl 42 corresponds to each pawl engagement/disengagement groove 47. When the first rotary cylinder 17 and the first linear movement cylinder 20 are registered, the angular position of the second rotary cylinder 30 in the first linear movement cylinder 20 is also registered, so that the position of the pair of cam projections 31 corresponds to the position of the pair of linear cam grooves 16. When the first linear movement cylinder 20 is inserted in the direction S in FIG. 4, the radially and outwardly extending cam projections 31 are inserted in the corresponding linear cam grooves 16 from the rear end of the first rotary cylinder 17.

As can be seen in FIG. 5, the linear cam groove 16, provided on the inner peripheral surface of the first rotary cylinder 17 to guide the cam projection 31, extends in the optical axis direction and intersects the rear annular groove 44 and the front annular groove 45 formed at different axial positions. The cam projection 31 is located slightly in front of the intersection point of the linear cam groove 16 and the rear annular groove 44 in the linear cam groove 16 when the zoom lens barrel 10 is in the retracted position (see FIG. 1). In accordance with the forward movement of the zoom lens barrel 10, the cam projection 31 is moved to the front extremity of the linear cam groove 16 (indicated by two-dot chain line in FIG. 5), while receiving a moving force in the circumferential direction. Consequently, the cam projection 31 passes through the intersection of the front annular groove 45 with the linear cam groove 16 during the zooming operation. It is necessary to prevent the cam projection 31 from being disengaged from the linear cam groove 16 and entering the front annular groove 45 at the intersection. Likewise, it is necessary to prevent the front and rear engagement pawls 42 and 41 which move in the front and rear annular grooves 44 and 45, respectively, from being disengaged therefrom and entering the linear cam groove 16 at the intersection with the linear cam groove. In the illustrated embodiment, no disengagement of the radial projections from the associated grooves occurs due to the structure discussed below.

A pair of cam projections 31 are each provided on its outer surface with a pair of parallel guided surfaces (parallel planar surfaces) 31a. The distance between the guided surfaces 31a corresponds to the width distance A2 (FIG. 5) of the linear cam groove 16 in the circumferential direction. Consequently, when the cam projection 31 is inserted in the linear cam groove 16, so that the guided surfaces 31a abut against the opposed side walls of the linear cam groove 16, the cam projection 31 can be moved in the linear cam groove 16 in the optical axis direction. The length B1 of the guided surfaces 31a is larger than the groove width B2 of the front annular groove 45 in the optical axis direction. Therefore, when the cam projection 31 passes through the intersection between the linear cam groove 16 and the front annular groove 45, the guided surfaces 31a which extend in the optical axis direction are always at least partly engaged with the wall surfaces of the linear cam groove 16, and hence, no disengagement of the cam projection 31 from the linear cam groove 16 or no entry of the cam projection 31 into the front annular groove 45 occurs during zooming.

Moreover, in the illustrated embodiment, the length A1 of the front engagement pawls 42 which are engaged in the front annular groove 45, in the circumferential direction is greater than the groove width A2 of the linear cam groove 16 in the circumferential direction. Consequently, when the front engagement pawls 42 are moved in the front annular groove 45 to the intersection point with the linear cam groove 16 in accordance with the relative rotation of the first rotary cylinder 17 and the first linear movement cylinder 20, the front engagement pawls 42 are always at least partly engaged with the front annular groove 45 so that the engagement pawls 42 do not enter the linear cam groove 16.

Figure 1:
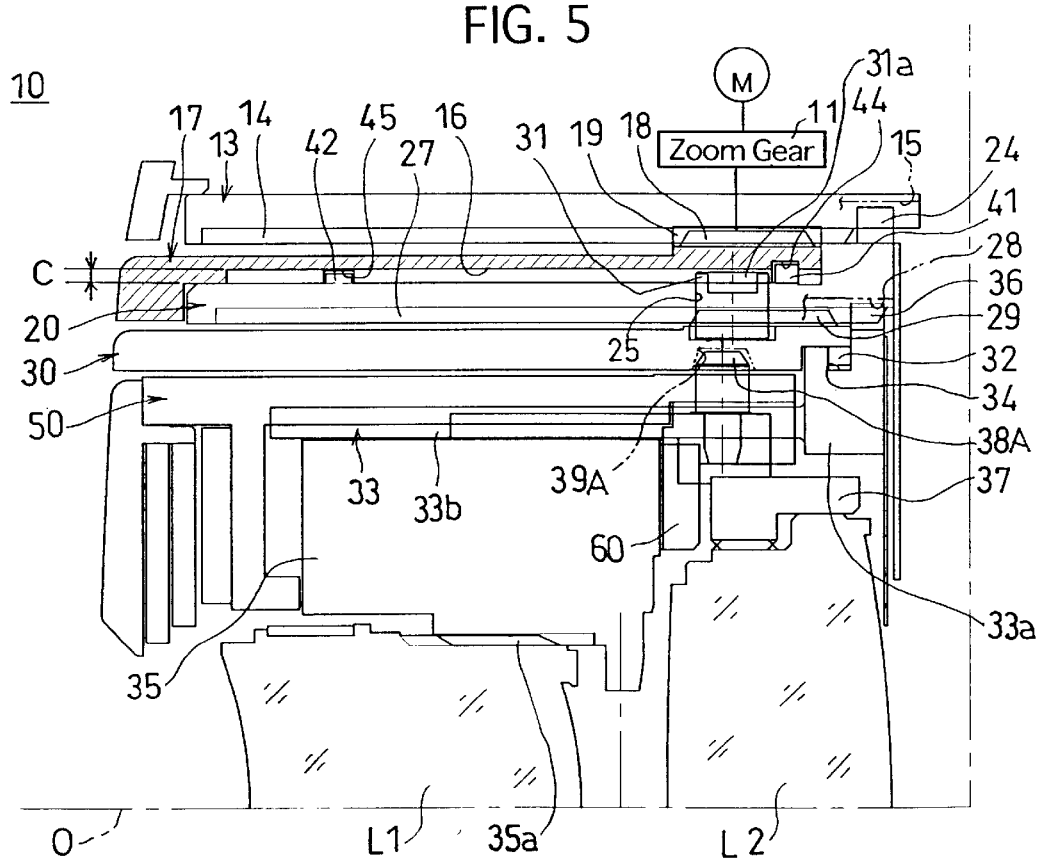
FIG. 1 is a longitudinal sectional view of a zoom lens barrel in a retracted position, according to a first embodiment of the present invention.
Figure 2:
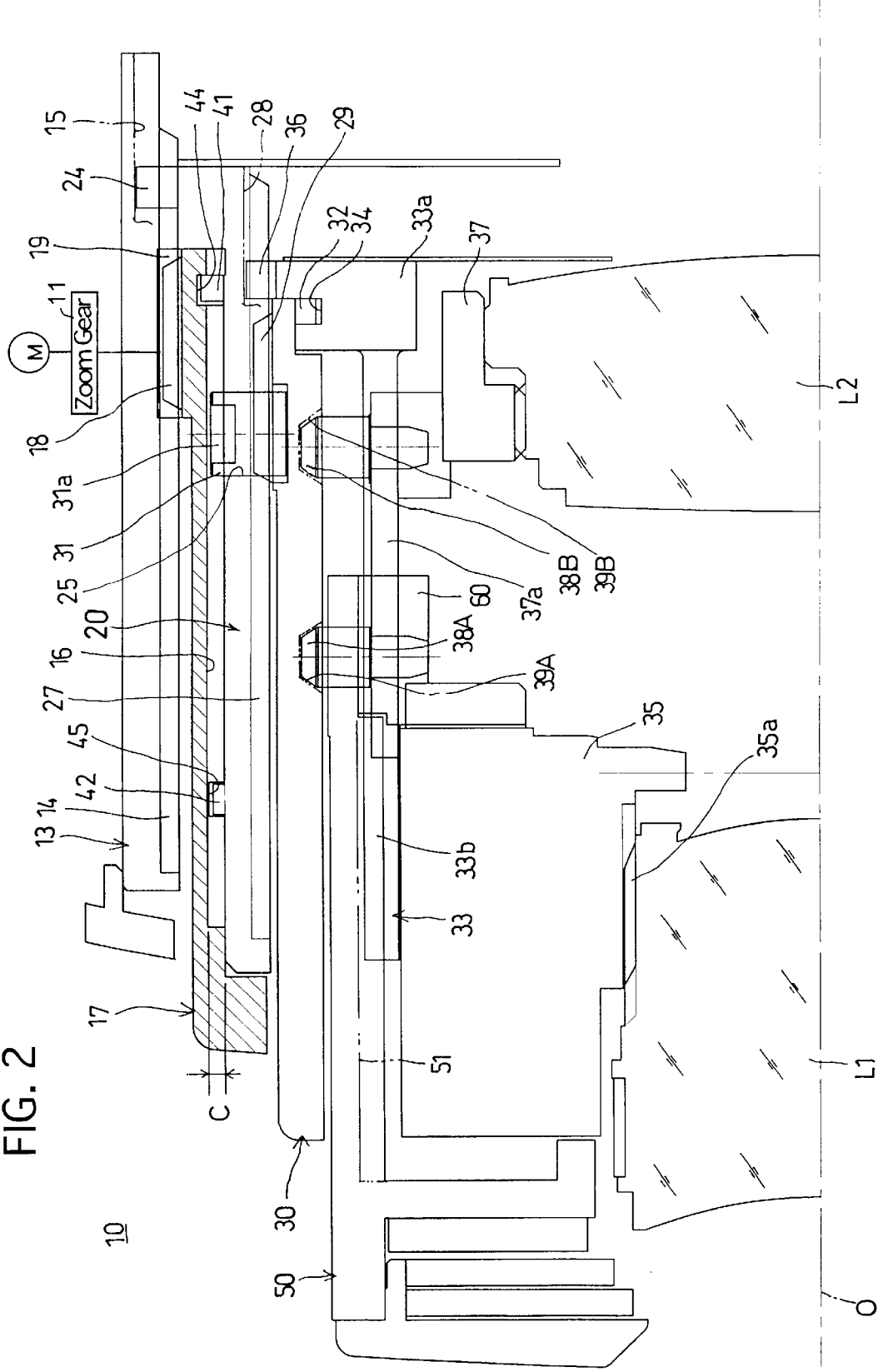
FIG. 2 is a longitudinal sectional view of a zoom lens barrel shown in FIG. 1, which is extended to a wide-angle extremity, according to the present invention.
Figure 3:
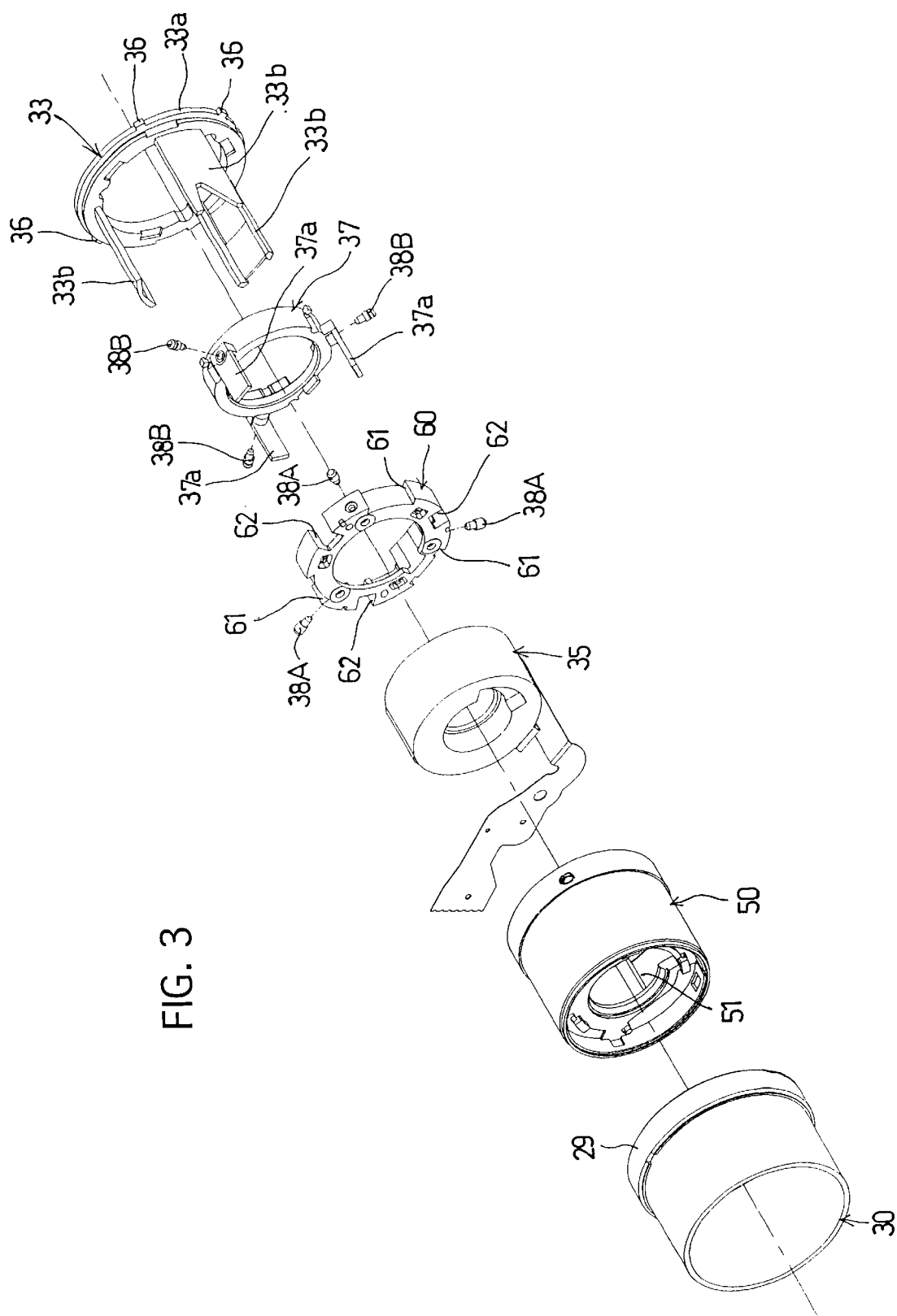
FIG. 3 is an exploded perspective view of elements located inside a second rotary cylinder of a zoom lens barrel shown in FIGS. 1 and 2.

As can be seen in FIGS. 1, 2 and 4, the depth of the linear cam groove 16 in the radial direction of the zoom lens barrel 10 is substantially identical to that of the front annular groove 45 (indicated by C in FIGS. 1 and 2). As mentioned above, since the length of engagement of each cam projection 31 and the linear cam groove 16 in the optical axis direction is greater than the groove width of the front annular groove 45 in the optical axis direction (B1>B2), the engagement depth between the cam projection 31 and the linear cam groove 16 in the radial direction can be optionally set, regardless of the depth of the front annular groove 45. Likewise, since the engagement length of each front engagement pawl 42 and the front annular groove 45 in the circumferential direction is greater than the groove width of the linear cam groove 16 in the circumferential direction (A1>A2), the engagement depth between the front engagement pawls 42 and the front annular groove 45 in the radial direction can be optionally set, regardless of the depth of the linear cam groove 16. From the viewpoint of the miniaturization of the zoom lens barrel, it is preferable that the engagement depth of the grooves and the projections in the radial direction be made as small as possible so long as necessary connection strength is provided. In the illustrated embodiment, the depth of the grooves 16 and 45 is reduced to the minimum value C to miniaturize the lens barrel.

Since the rear engagement pawls 41 have the same length A1 as the front engagement pawls 42 in the circumferential direction, no disengagement thereof at the intersection point between the rear annular groove 44 and the linear cam groove 16 occurs. In the illustrated embodiment, the depth of the rear annular groove 44 in the radial direction is greater than the linear cam groove 16 or the front annular groove 45, but it is alternatively possible to make the linear cam groove 16, and front and rear annular grooves 45 and 44 identical in depth in the radial direction, so long as sufficient connection length is obtained.

As can be understood from the foregoing, in the zoom lens barrel 10 according to the present invention, each of the cam projections 31 is provided on its outer surface with a pair of guided surfaces 31a which extend in the optical axis direction to engage with the linear cam groove 16, and the axial length B1 of the guided surfaces 31a is larger than the axial width B2 of the front annular groove 45. Consequently, during the axial movement of the lens barrel, no disengagement of the cam projections 31 from the linear cam groove 16 at the intersection points between the front annular groove 45 and the linear cam groove 16 takes place. Furthermore, since the circumferential length (engagement length) A1 of each of the front and rear engagement pawls 41 and 42 is larger than the circumferential width A2 of the linear cam groove 16, no disengagement of the engagement pawls 41 and 42 from the linear cam groove 16 at the intersection points between the annular grooves 44, 45 and the linear cam groove 16 takes place. In particular, in the structure in which the engagement length of the radial projections (front and rear engagement pawls 42 and 41, and cam projections 31) with corresponding guide grooves (front and rear annular grooves 45 and 44, and linear cam groove 16) in the direction of the sliding movement is greater than the groove width of other grooves that do not correspond to the radial projections, the engagement depth of the guide grooves and the projections in the radial direction can be reduced, and accordingly, the size of the lens barrel in the radial direction can be reduced.

Note that the axial length B1 of the guided surfaces 31a of each cam projection 31 is larger than the axial width of the rear annular groove 44 in the illustrated embodiment. Therefore, there is no chance of the cam projections 31 slipping off at the intersection point between the linear cam groove 16 and the rear annular groove 44 when the cam projections 31 are inserted in the linear cam groove 16 from the rear end face of the first rotary cylinder 17 upon assembling of the lens barrel.

Figure 7:
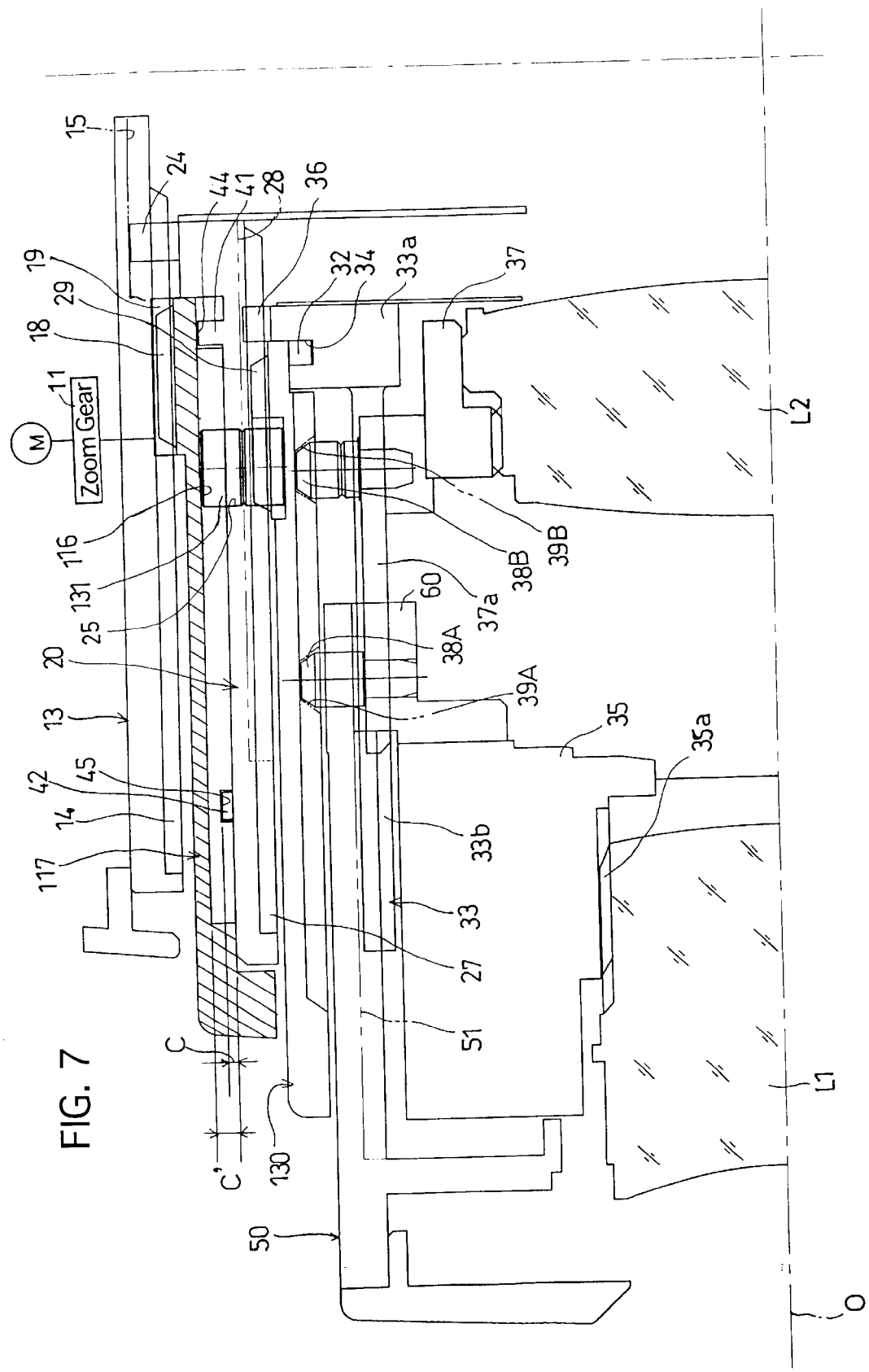
FIG. 7 is a longitudinal sectional view of a zoom lens barrel shown in FIG. 6, which is extended to a wide-angle extremity.
Figure 8:
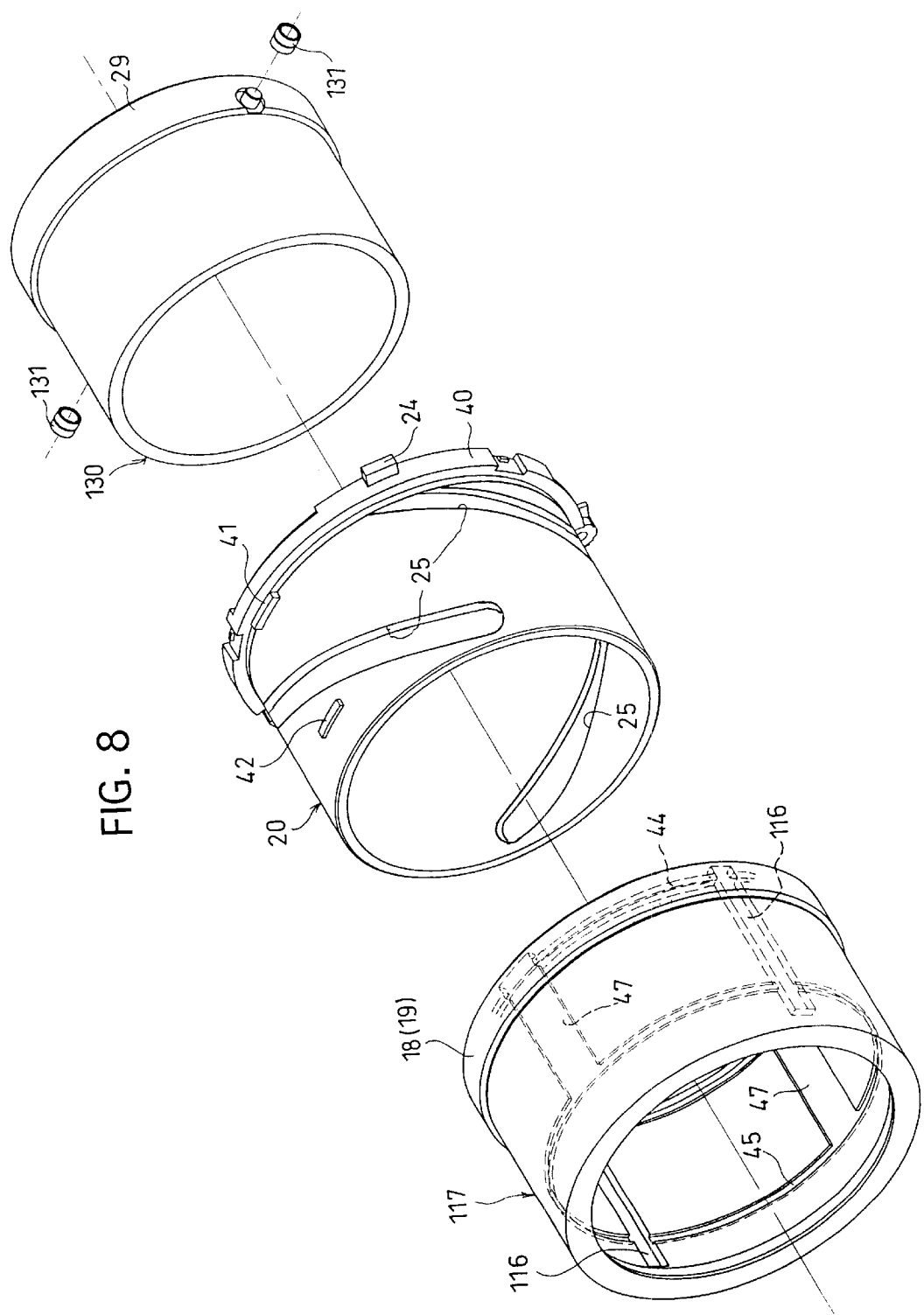
FIG. 8 is an exploded perspective view of a first rotary cylinder, a first linear movement cylinder, and a second rotary cylinder, of a zoom lens barrel shown in FIGS. 6 and 7.
Figure 14:
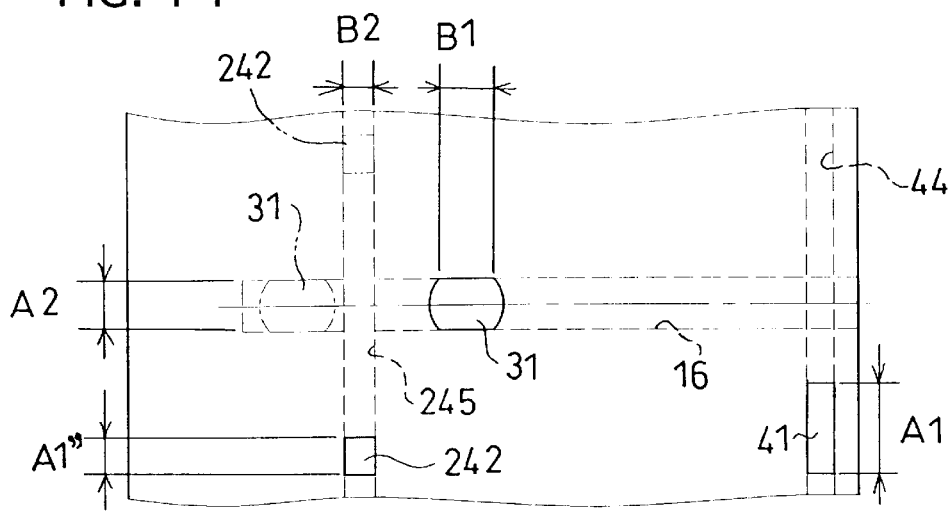
FIG. 14 is a developed plan view of a relationship between linear cam grooves and cam projections, and between annular grooves and engagement pawls, in a zoom lens barrel shown in FIGS. 10 and 11.

FIGS. 6 through 9 show a second embodiment of the present invention. In FIGS. 6 through 9, the elements corresponding to those in FIGS. 1 through 5 are designated with like reference numerals. In this embodiment, a pair of linear cam grooves (axial grooves) 116 formed on the inner peripheral surface of the first rotary cylinder (cylindrical member) 117 have a width A2' in the circumferential direction, which is slightly larger than that of the linear cam groove 16 in the first embodiment. As shown in FIGS. 6 through 8, the depth C' of the linear cam grooves 116 in the radial direction is larger than the depth C of the front annular groove 45. A pair of cam projections 131 provided on the second rotary cylinder 130, which are slidably engaged in the linear cam grooves 116, are formed from cylinders whose diameter corresponds to the groove width A2' of the linear cam grooves 116. The cam projections 131 are brought into contact with the opposed wall surfaces of the linear cam grooves 116 at opposite longitudinal sides of the cam projections (axial guide projection) 131. The amount of projection of the cam projections 131 in the radial direction corresponds to the depth C' of the linear cam grooves 116.

Consequently, when the cam projections 131 which slide in the linear cam grooves 116 pass through the intersections with the front annular groove 45, there is no chance of the cam projections 131 being disengaged from the linear cam grooves 116 and entering the front annular groove 45, since the front ends of the cam projections 131 are partly engaged with the linear cam grooves 116 whose depth is greater than the front annular groove 45.

Since a pair of front engagement pawls 42 which are slidably fitted in the front annular groove 45 have a circumferential width (engagement length) A1 greater than the circumferential groove width A2' of the linear cam grooves 116, when the front engagement pawls 42 are moved in the front annular groove 45 so as to reach the intersection with the linear cam grooves 116, no disengagement of the front engagement pawls from the front annular groove 45 takes place.

FIGS. 10 through 14 show a third embodiment of the present invention. In FIGS. 10 through 14, the elements corresponding to those in the previous embodiments are designated with like reference numerals. In this embodiment, a pair of linear cam grooves 16 formed on the first rotary cylinder (cylindrical member) 217 and a pair of cam projections 31 provided on the second rotary cylinder 30 are identical in structure to those in the first embodiment. Namely, each cam projection 31 has a pair of guided surface 31a which can be engaged by the opposed wall surfaces of the linear cam groove 16. The cam projections 31 and the linear cam groove 16 have a longer engagement length in the optical axis direction and a smaller engagement length in the radial direction, than those of the cam projections 131 and the linear cam grooves 116 in the second embodiment.

Figure 10:
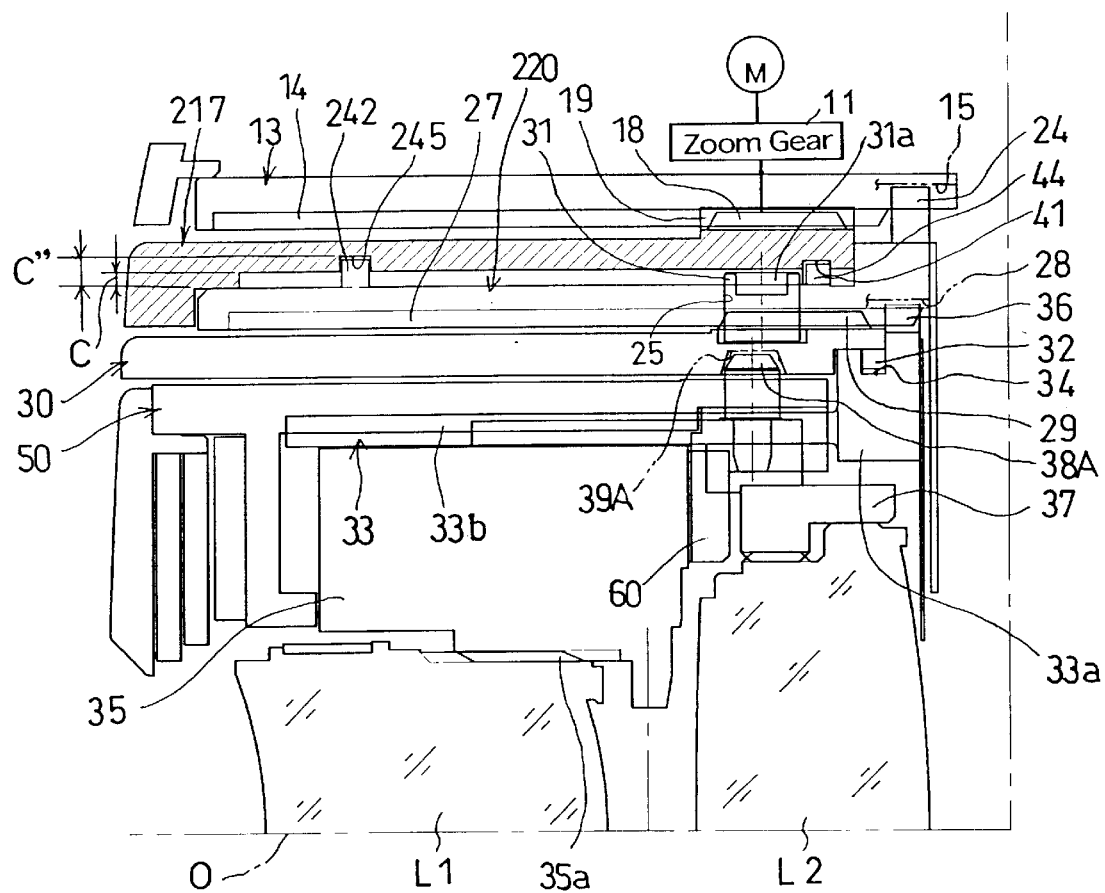
FIG. 10 is a longitudinal sectional view of a zoom lens barrel in a retracted position, according to a third embodiment of the present invention.
Figure 11:
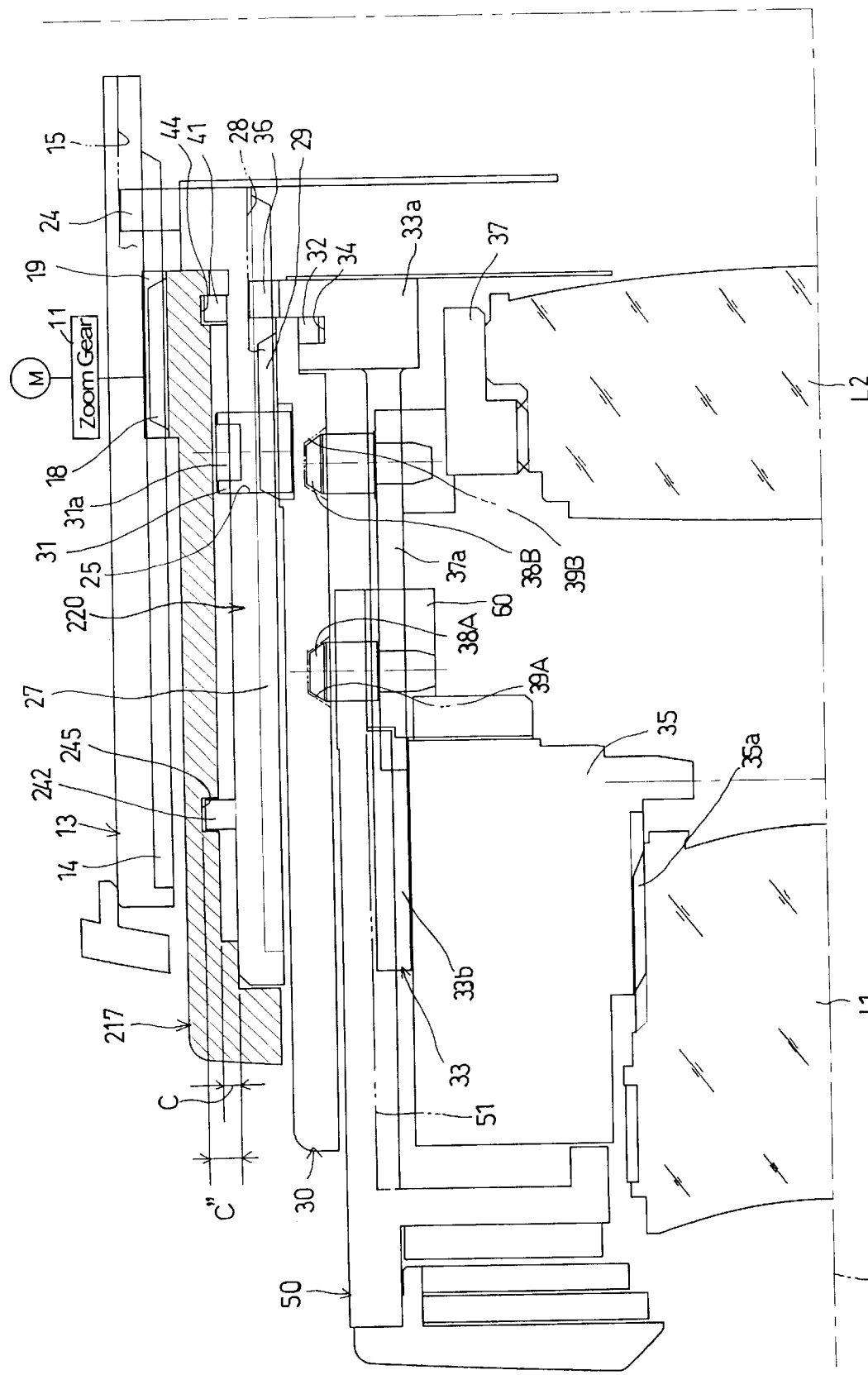
FIG. 11 is a longitudinal sectional view of a zoom lens barrel shown in FIG. 10, which is extended to a wide-angle extremity.
Figure 12:
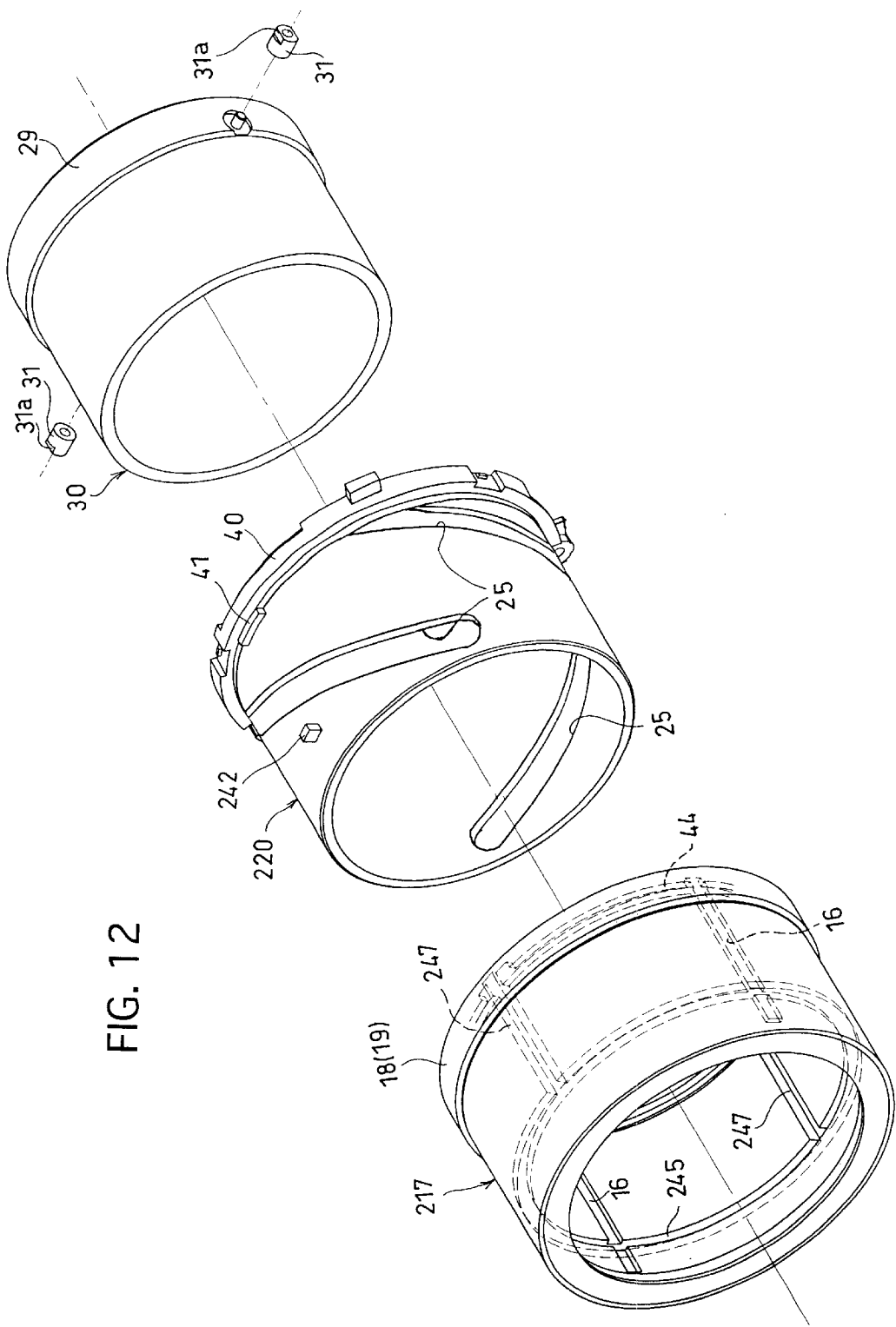
FIG. 12 is an exploded perspective view of a first rotary cylinder, a first linear movement cylinder, and a second rotary cylinder, of a zoom lens barrel shown in FIGS. 10 and 11.
Figure 13:
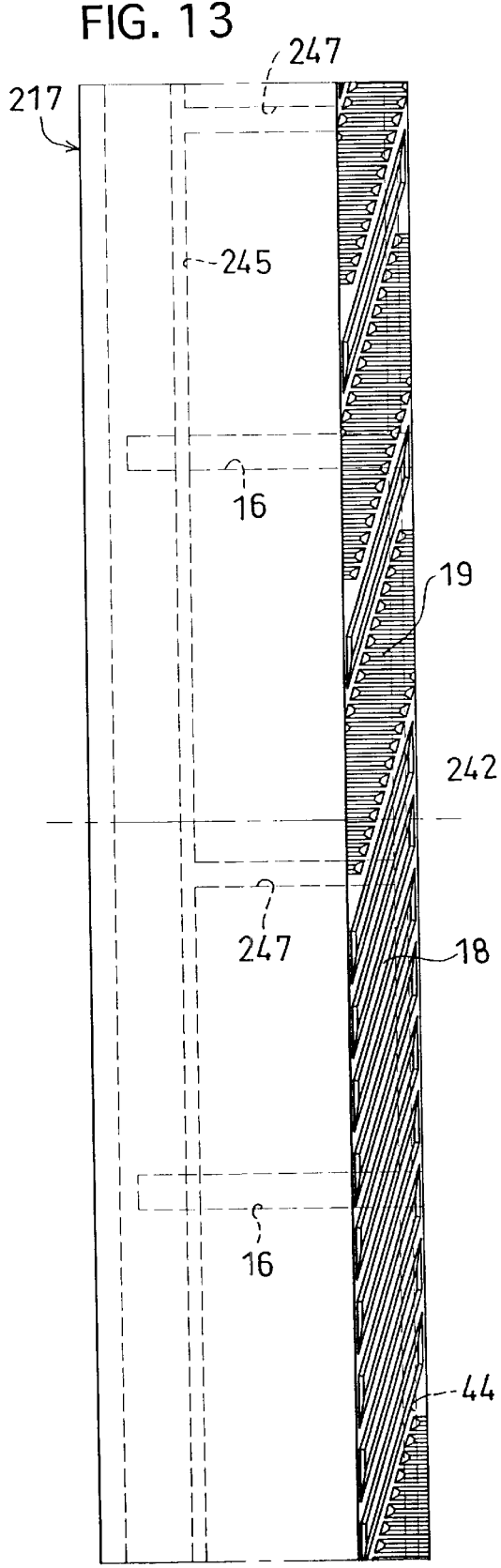
FIG. 13 is a developed view of a first rotary cylinder and a first linear movement cylinder in a zoom lens barrel shown in FIGS. 10 and 11.
Figure 13:
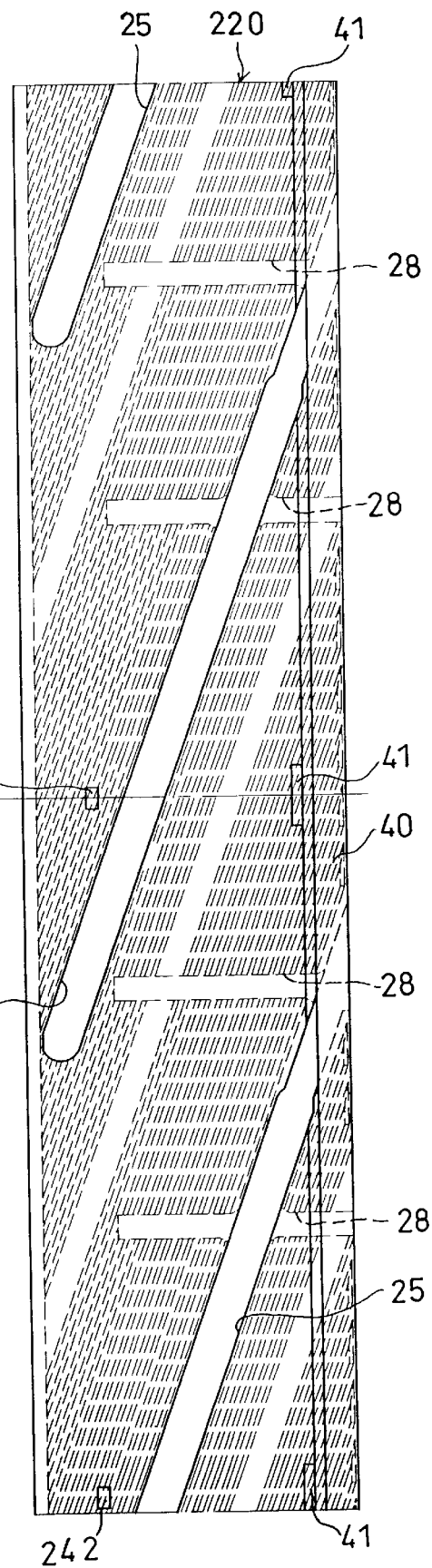

The depth C" of the front annular groove 245 in the radial direction is greater than the radial depth C of the linear cam groove 16, as shown in FIGS. 10 through 12. Similar to the front annular groove 45 in the first and second embodiment, the width B2 of the front annular groove 245 in the optical axis direction is smaller than the length B1 of the guided surfaces 31a in the optical axis direction. The front engagement pawls 242 provided on the first linear movement cylinder (first moving member (barrel) or second cylindrical member (barrel)) 220 that are slidably fitted in the front annular groove 245 have a length of projection longer than that of the front engagement pawls 42 in the first and second embodiments so as to correspond to the depth C" of the front annular groove 245. Conversely, the length A1" of the front engagement pawls 242 in the circumferential direction is smaller than the groove width A2 of the linear cam groove 16 in the circumferential direction. As shown in FIG. 12, a pair of pawl engagement/disengagement grooves 247 provided in the first rotary cylinder 217 are narrower in the circumferential width and deeper in the radial direction, than the pawl engagement/disengagement grooves 47 in the previous embodiments, correspondingly to the front engagement pawls 242.

In the structure mentioned above, since the length B1 is greater than the length B2 (B1>B2) as in the first embodiment, when the cam projections 31 pass through the intersection between the linear cam groove 16 and the front annular grooves 245, no disengagement of the cam projections 31 from the linear cam groove 16 occurs. Moreover, although the front engagement pawls 242 are shorter in the circumferential direction than the width of the linear cam groove 16, since the front engagement pawls 242 have a greater (deeper) length of engagement with the front annular groove 245 in the radial direction, when the front engagement pawls 242 pass through the intersection between the front annular groove 245 and the linear cam groove 16, no disengagement thereof from the front annular groove 245 takes place.

Note that the structure of the rear annular groove 44 and the rear engagement pawls 41 is the same as that in the first and second embodiments. Consequently, the rear engagement pawls 41, whose length in the circumferential direction is length A1, cannot be disengaged from the rear annular groove 44 at the intersection with the linear cam groove 16.

As can be understood from the above discussion, according to the zoom lens barrel of the present invention, since the intersecting guide grooves provided on an inner peripheral surface of a cylindrical member and the radial projections corresponding to the guide grooves are shaped so that the radial projections cannot engage with the non-corresponding guide grooves, no disengagement of the radial projections from the corresponding guide grooves at the intersections of the guide grooves occurs. For instance, in the case where the intersecting guide grooves include an axial groove extending in parallel with the optical axis and a circumferential groove about the optical axis, the engagement length between the axial guide projection and the axial groove corresponding thereto in at least one of the axial and radial directions is greater than the axial width or radial depth of the circumferential groove. Likewise, the engagement length between the circumferential guide projection and the circumferential groove corresponding thereto in at least one of the axial and radial directions is greater than the circumferential width or radial depth of the axial groove. Consequently, no entrance of the projections into the non-corresponding grooves takes place.

The present invention is not limited to the illustrated embodiments. Although the intersecting grooves have an axial groove and a circumferential groove substantially perpendicular thereto, in the illustrated embodiments, the present invention can be applied to non-orthogonal grooves. Namely, it is possible to prevent the radial projections from entering non-associated grooves by appropriately differentiating the engagement length of the corresponding projections and grooves in the slide movement direction and/or radial direction.

In the illustrated embodiment, the intersecting grooves include an axial groove and a circumferential groove, and two annular grooves (circumferential grooves) are formed at different axial positions. However, the number and the axial positions of the circumferential grooves are not limited to those in the illustrated embodiments. For example, the shape of the front annular groove 45 or 245 and the front engagement pawls 42 and 242 in the illustrated embodiments can be applied to the rear annular groove 44 and the rear engagement pawls 41. Moreover, the number of the circumferential grooves can be one or three or more; and likewise for the axial grooves and the axial guide projections which are engaged therein. Namely, the number of the axial grooves and the axial guide projections is not limited to two, more than two can be provided.

As can be understood from the above discussion, according to the present invention, a zoom lens barrel in which the radial guide projections guided in a plurality of intersecting guide grooves can be prevented from being disengaged from the associated guide grooves can be provided. Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens barrel comprising:
 a first cylindrical member having first and second grooves on an inner peripheral surface thereof, said first and second grooves having different profiles, wherein said first and second grooves intersect each other;
 a first moving member which is provided with a first radial projection which is fitted in the first groove, said first moving member being movable relative to the first cylindrical member in accordance with the profile of the first groove; and
 a second moving member which is provided with a second radial projection which is fitted in the second groove, said second moving member being movable relative to the first cylindrical member in accordance the profile of the second groove;
 wherein the shapes of the first groove and the first radial projection and the shapes of the second groove and the second radial projection are such that the second radial projection cannot be fitted in the first groove and that the first radial projection cannot be fitted in the second groove.

2. The zoom lens barrel according to claim 1, wherein said first cylindrical member having the first and second grooves is driven and rotated by a rotational drive device;
 said first moving member defines a second cylindrical member which is guided to move in an optical axis direction within the first cylindrical member; and
 said second moving member defines a third cylindrical member which is guided to rotate and move in the optical axis direction within the second cylindrical member.

3. The zoom lens barrel according to claim 1, wherein:
 said first groove is a circumferential groove about an optical axis; and
 said second groove is an axial groove extending in parallel with the optical axis.

4. The zoom lens barrel according to claim 1, wherein a length of said first radial projection along said first groove is greater than a width of said second groove, and a length of said second radial projection along said second groove is greater than a width of said first groove.

5. The zoom lens barrel according to claim 1, wherein said first and second grooves are bottomed grooves; one of said first and second radial projections is longer, in a radial direction thereof, than a depth of the groove in which the other of said first and second radial projections is fitted; and
 a length of said one of said first and second radial projections, along the groove in which said one of said first and second radial projection is fitted, is greater than a width of said groove in which the other of said first and second radial projection is fitted.

6. A zoom lens barrel comprising:
 a first cylindrical member having, on an inner peripheral surface thereof, an axial bottomed groove extending in parallel with an optical axis and a circumferential bottomed groove extending in the circumferential direction about the optical axis, said circumferential groove intersecting the axial bottomed groove;
 a first moving member which is provided with a circumferential guide projection which is fitted in the circumferential bottomed groove, said first moving member being movable relative to the first cylindrical member in accordance with the profile of the circumferential bottomed groove; and
 a second moving member which is provided with an axial guide projection which is fitted in the axial bottomed groove, said second moving member being movable relative to the first cylindrical member in accordance with the profile of the axial bottomed groove;
 wherein the engagement length of the circumferential guide projection and the circumferential bottomed groove, in at least one of the circumferential direction and the radial direction perpendicular to the optical axis, is greater than the corresponding at least one of the circumferential width and radial depth of the axial bottomed groove; and wherein the engagement length of the axial guide projection and the axial bottomed groove, in at least one of the axial bottomed direction and the radial direction perpendicular to the optical axis, is greater than the corresponding at least one of the axial width and radial depth of the circumferential bottomed groove.

7. The zoom lens barrel according to claim 6, wherein
said axial guide projection is provided with a pair of parallel planar surfaces which are brought into sliding contact with a pair of opposed wall surfaces of the axial groove which extend in the optical axis direction, said planar surfaces having axial lengths greater than the axial width of the circumferential groove; wherein the circumferential length of the circumferential guide projection is greater than the circumferential width of the axial groove.

8. The zoom lens barrel according to claim 7, wherein the radial depth of the axial groove is substantially identical to the radial depth of the circumferential groove.

9. The zoom lens barrel according to claim 6, wherein
said axial guide projection is provided with a pair of parallel planar surfaces which are brought into sliding contact with a pair of opposed wall surfaces of the axial groove which extend in the optical axis direction, said planar surfaces having axial lengths greater than the axial width of the circumferential groove;

wherein the radial depth of the circumferential groove is greater than the radial depth of the axial groove, said circumferential guide projection being fitted in the circumferential groove so that the length of projection of the circumferential guide projection in the radial direction is greater than the depth of the axial groove.

10. The zoom lens barrel according to claim 9, wherein the circumferential length of the circumferential guide projection is smaller than the circumferential width of the axial groove.

11. The zoom lens barrel according to claim 6, wherein the radial depth of the axial groove is greater than the radial depth of the circumferential groove, said axial guide projection being fitted in the axial groove so that the length of projection thereof in the radial direction is greater than the depth of the circumferential groove;

wherein the circumferential length of the circumferential guide projection is greater than the circumferential width of the axial groove.

12. The zoom lens barrel according to claim 11, wherein said axial guide projection is in the form of a cylinder which is brought into contact at opposite longitudinal sides of said cylinder with a pair of opposed wall surfaces, which extend in the optical axis direction, of the axial groove.

13. The zoom lens barrel according to claim 6, wherein said first cylindrical member is driven and rotated by a rotational drive device; wherein said first moving member defines a second cylindrical member which is guided to move in an optical axis direction within the first cylindrical member;

said second moving member defines a third cylindrical member which is guided to move in the optical axis direction within the second cylindrical member, while being rotated relative to the second cylindrical member in accordance with the rotation of the first cylindrical member in accordance with the profile of the axial groove; and said second cylindrical member is provided with a through groove through which the axial guide projection of the third cylindrical member extends.

14. A barrel assembly used in a zoom lens barrel comprising:

a first cylindrical member having, on an inner peripheral surface thereof, an axial groove extending in parallel with an optical axis and a circumferential groove extending in the circumferential direction about the optical axis, said circumferential groove intersecting the axial groove;

a first moving barrel which is provided with a circumferential guide projection which is fitted in the circumferential groove, said first moving barrel being movable relative to the first cylindrical member in accordance with the profile of the circumferential groove; and a second moving barrel which is provided with an axial guide projection which is fitted in the axial groove, said second moving barrel being movable relative to the first cylindrical member in accordance with the profile of the axial groove;

wherein the engagement length of the circumferential guide projection and the circumferential groove, in at least one of the circumferential direction and the radial direction perpendicular to the optical axis, is greater than the corresponding at least one of the circumferential width and radial depth of the axial groove; and wherein the engagement length of the axial guide projection and the axial groove, in at least one of the axial direction and the radial direction perpendicular to the optical axis, is greater than the corresponding at least one of the axial width and radial depth of the circumferential groove.

15. The barrel assembly according to claim 14, wherein
said axial guide projection is provided with a pair of parallel planar surfaces which are brought into sliding contact with a pair of opposed wall surfaces of the axial groove which extend in the optical axis direction, said planar surfaces having axial lengths greater than the axial width of the circumferential groove; and wherein the circumferential length of the circumferential guide projection is greater than the circumferential width of the axial groove.

16. The barrel assembly according to claim 15, wherein the radial depth of the axial groove is substantially identical to the radial depth of the circumferential groove.

17. The barrel assembly according to claim 14, wherein
said axial guide projection is provided with a pair of parallel planar surfaces which are brought into sliding contact with a pair of opposed wall surfaces of the axial groove which extend in the optical axis direction, said planar surfaces having axial lengths greater than the axial width of the circumferential groove; and wherein the radial depth of the circumferential groove is greater than the radial depth of the axial groove, said circumferential guide projection being fitted in the circumferential groove so that the length of projection of the circumferential guide projection in the radial direction is greater than the depth of the axial groove.

18. The barrel assembly according to claim 17, wherein the circumferential length of the circumferential guide projection is smaller than the circumferential width of the axial groove.

19. The barrel assembly according to claim 14, wherein the radial depth of the axial groove is greater than the radial depth of the circumferential groove, said axial guide projection being fitted in the axial groove so that the length of projection thereof in the radial direction is greater than the depth of the circumferential groove; and wherein the circumferential length of the circumferential guide projection is greater than the circumferential width of the axial groove.

20. The barrel assembly according to claim 19, wherein said axial guide projection is in the form of a cylinder which is brought into contact at opposite longitudinal sides of said cylinder with a pair of opposed wall surfaces, which extend in the optical axis direction, of the axial groove.

* * * * *